US011853470B2

(12) United States Patent
Boudville

(10) Patent No.: US 11,853,470 B2
(45) Date of Patent: Dec. 26, 2023

(54) METAVERSE AVATAR WEARING A CLICKABLE LINK

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 2 days.

(21) Appl. No.: 17/803,218

(22) Filed: Mar. 21, 2022

(65) Prior Publication Data

US 2023/0297162 A1    Sep. 21, 2023

(51) Int. Cl.
| | |
|---|---|
| *G06F 3/01* | (2006.01) |
| *G06Q 30/0601* | (2023.01) |
| *G06T 19/00* | (2011.01) |
| *G06T 13/40* | (2011.01) |

(52) U.S. Cl.
CPC ......... *G06F 3/011* (2013.01); *G06Q 30/0643* (2013.01); *G06T 13/40* (2013.01); *G06T 19/00* (2013.01)

(58) Field of Classification Search
CPC ..... G06F 3/011; G06Q 30/0643; G06T 13/40; G02B 27/017
See application file for complete search history.

(56) References Cited

U.S. PATENT DOCUMENTS

2022/0351281 A1* 11/2022 Morgan ................. H04L 51/02

* cited by examiner

*Primary Examiner* — Priyank J Shah

(57) ABSTRACT

A first avatar in a VR room can show a clickable image on its outer surface. Or it can wear a sandwich board showing clickable images. When a second avatar gets close to the first avatar, it can click the image, taking the second avatar to another room. The first avatar defines an off ramp from the first room, outside the control of the first room. An avatar can sing a link to another room. A listening avatar can decode the song and download the link and pick it, to go to the other room. A clickable link on an avatar can take both avatars to the same destination.

15 Claims, 15 Drawing Sheets

Avatar clicks image on another avatar

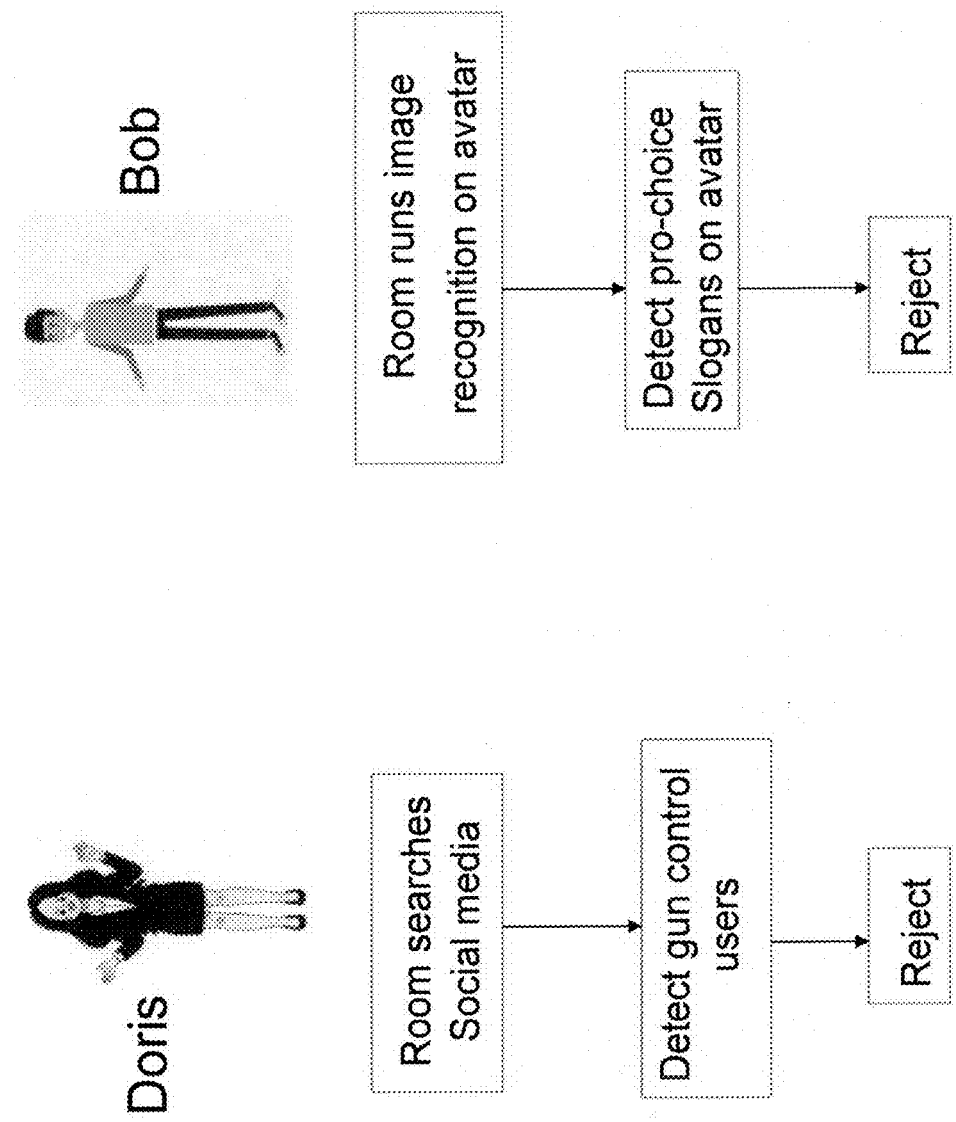
Figure 1  2 users' criteria for avatar guests

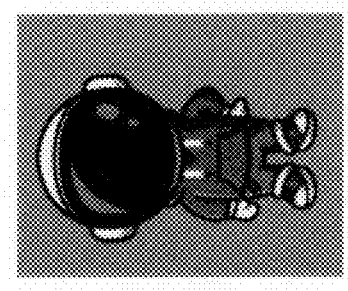
NFT
Figure 2  NFT pointing to an image

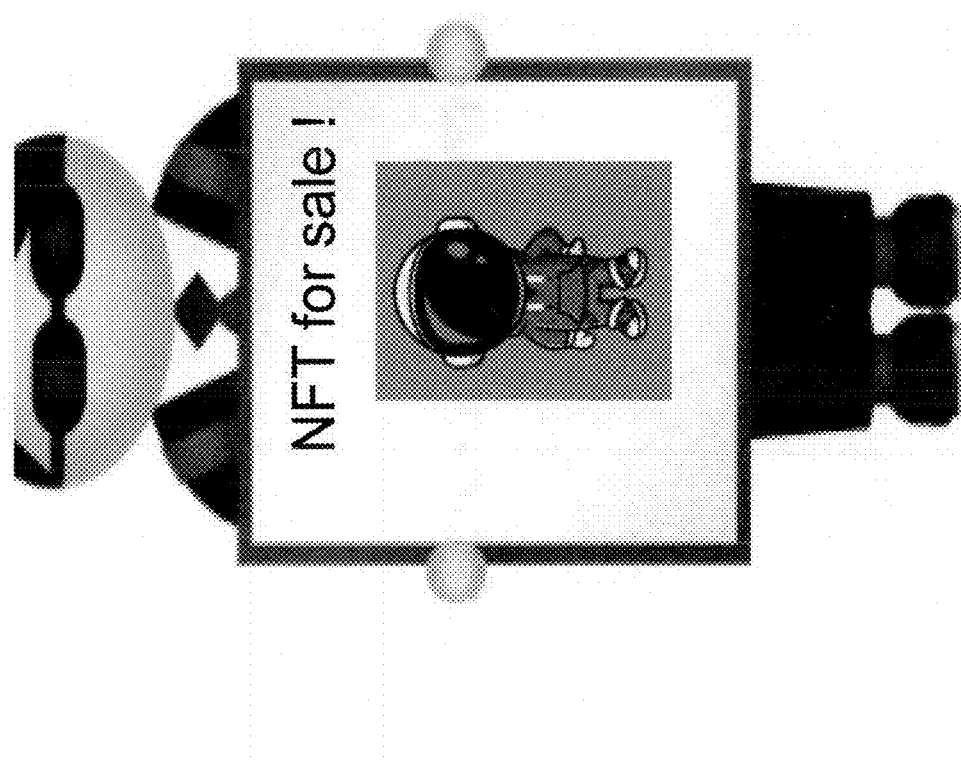
Figure 3 Avatar showing NFT image

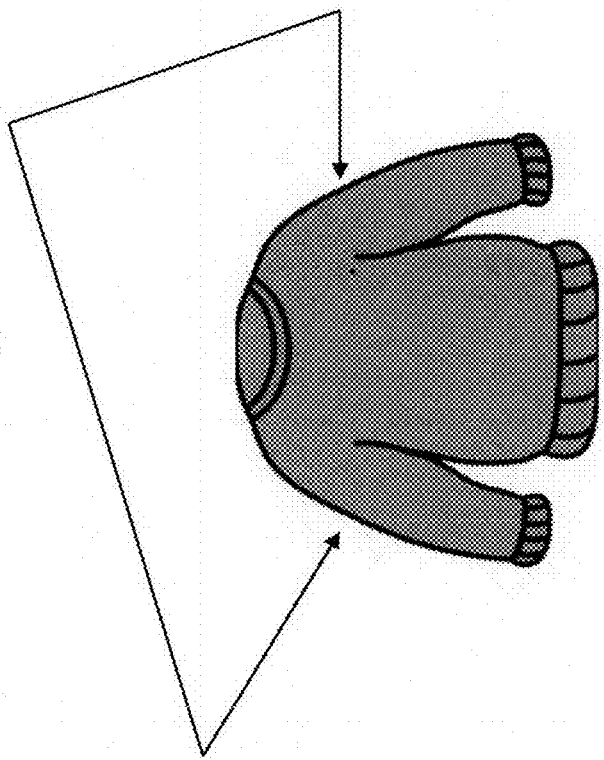
Figure 4  Long sleeves

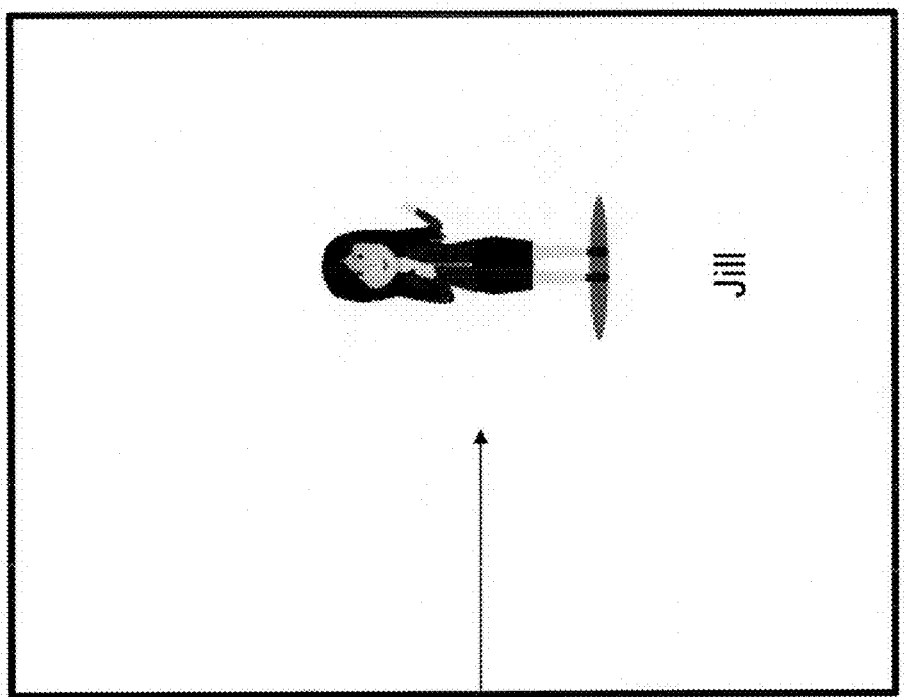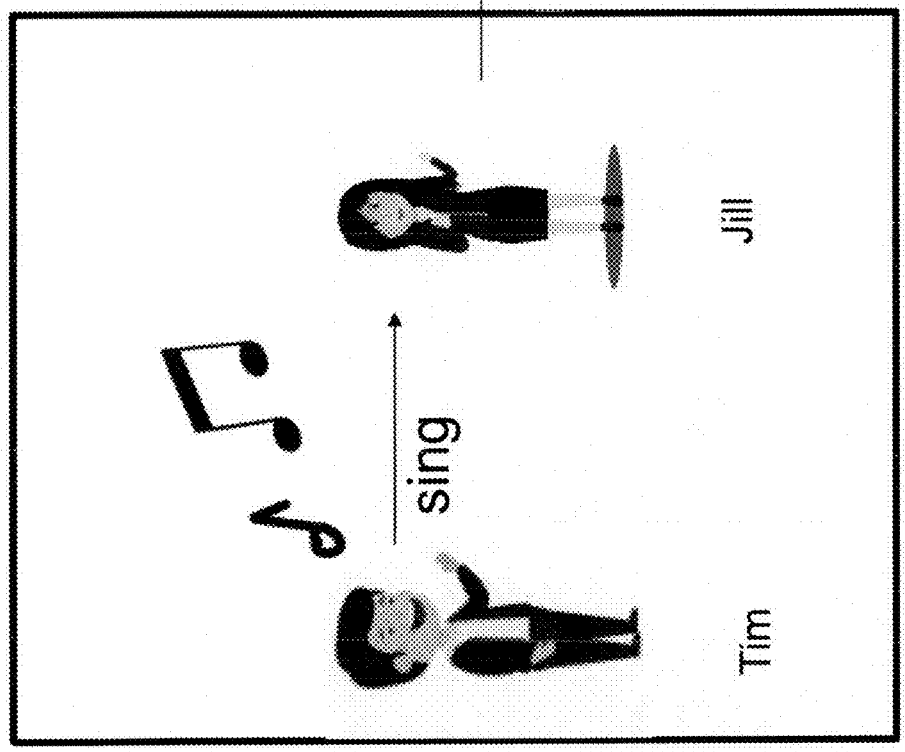
Figure 5 Singing a link to another room

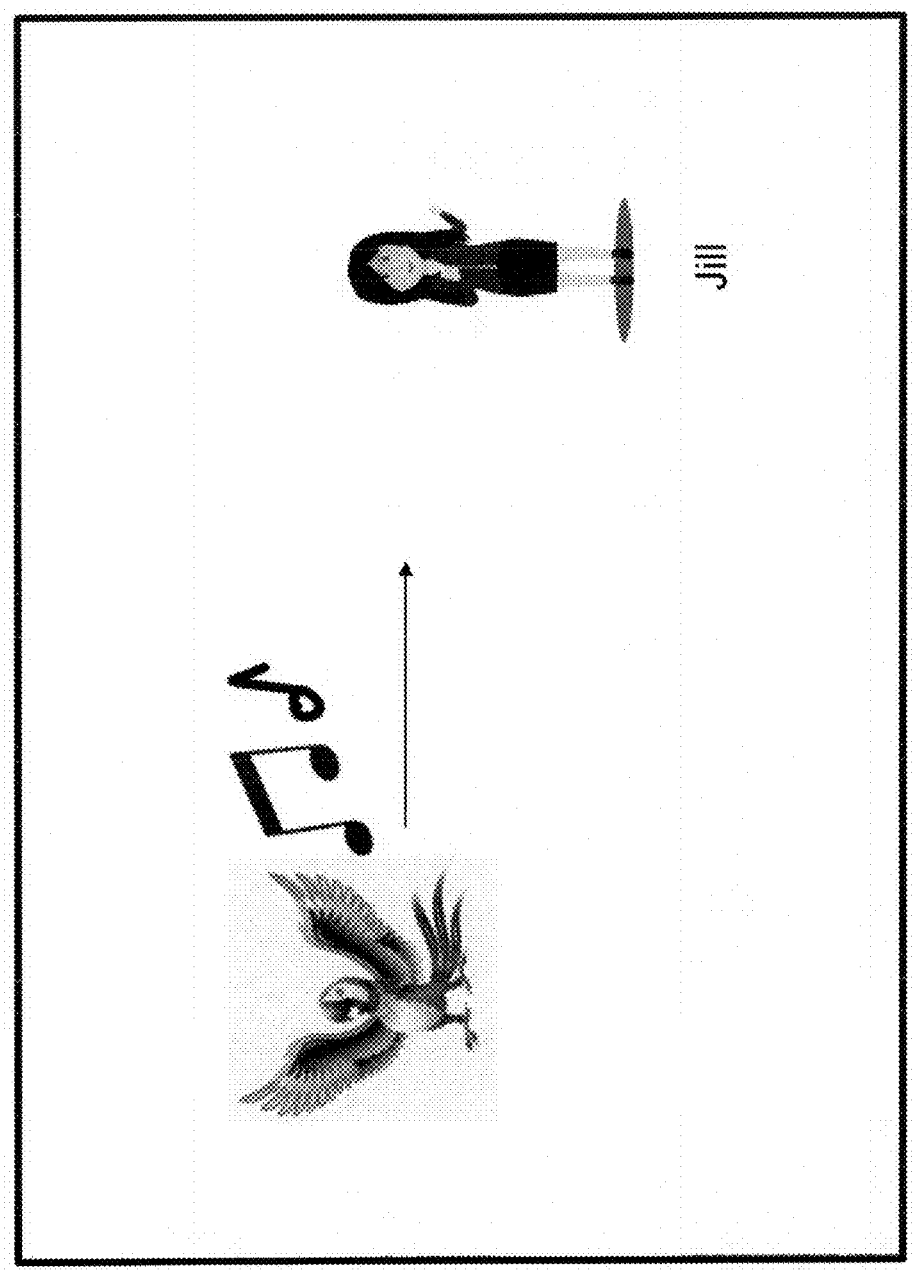
Figure 7 Using non-human avatar

| Avatar | Targets | Message | type |
|---|---|---|---|
| Tim | Jill | For you only | audio |
| Dinesh | Mark, Laura | See my playlist | text |
| Grace | Rahul<br>Chee | Try it again<br>I got the receipt!! | text |

| Avatar | Destination |
|---|---|
| Jeff | Moonbase |
| Ramon | Drum & Bass |

Figure 8  Control panel

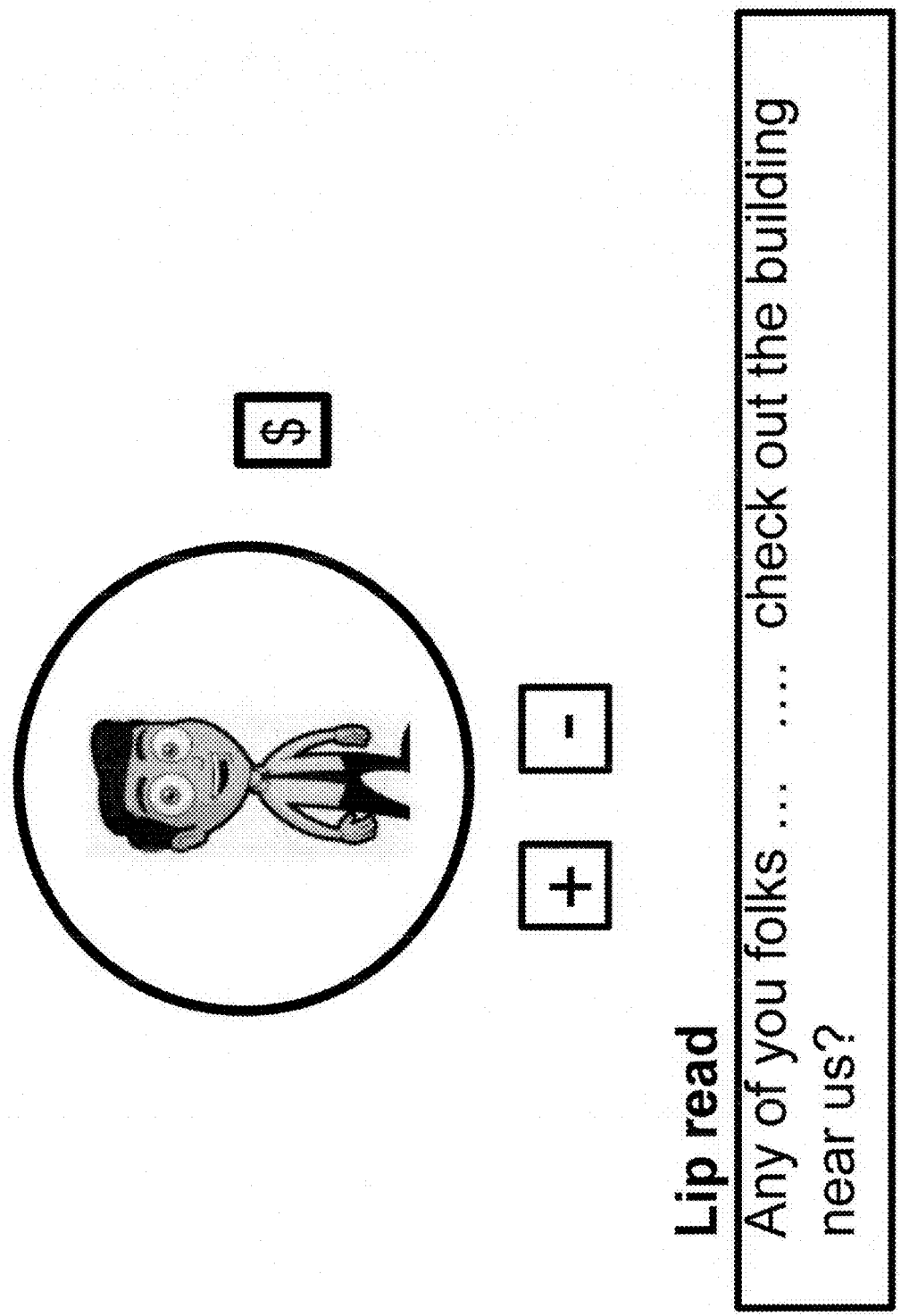
Figure 9   Expanded sight

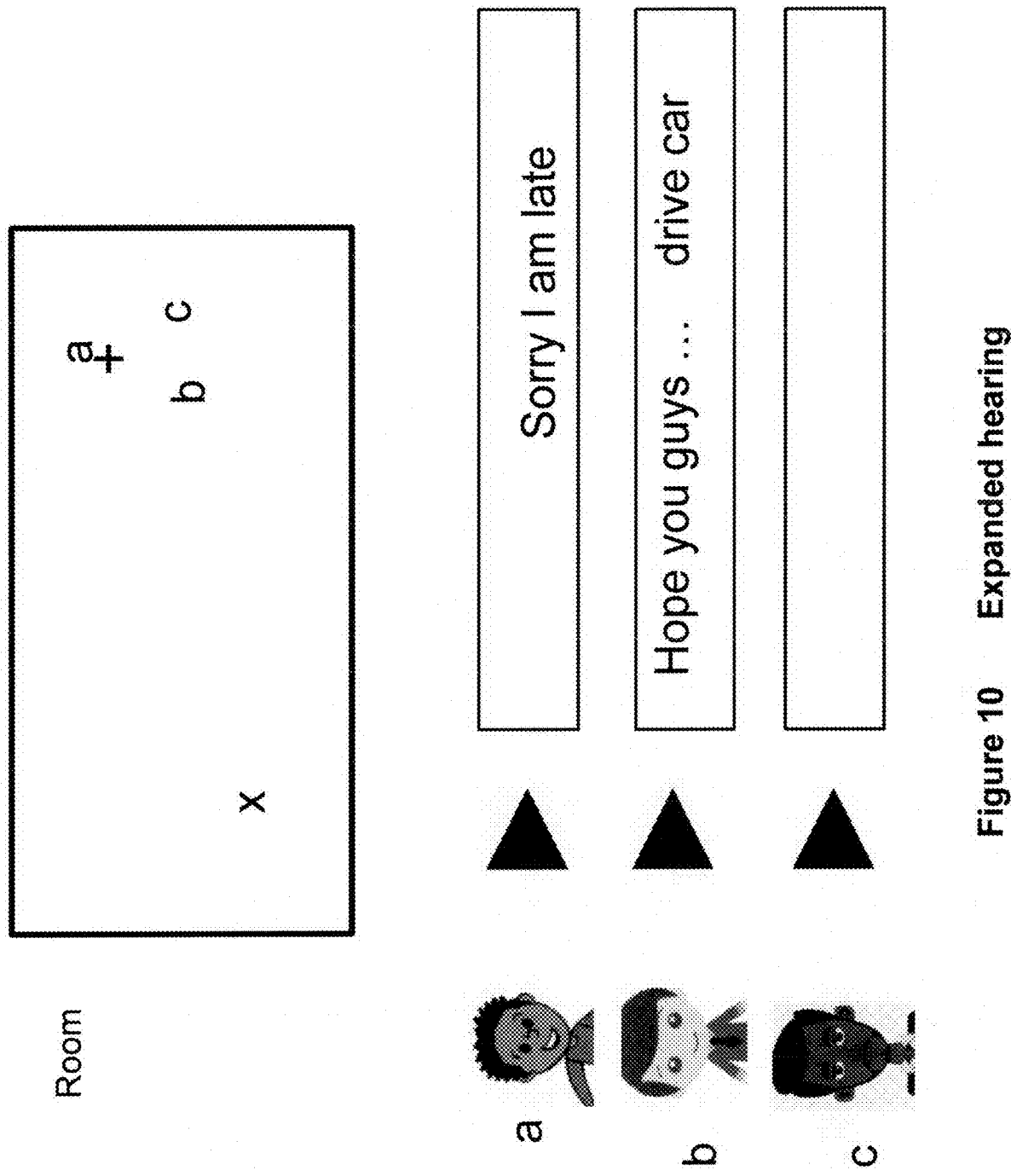
Figure 10  Expanded hearing

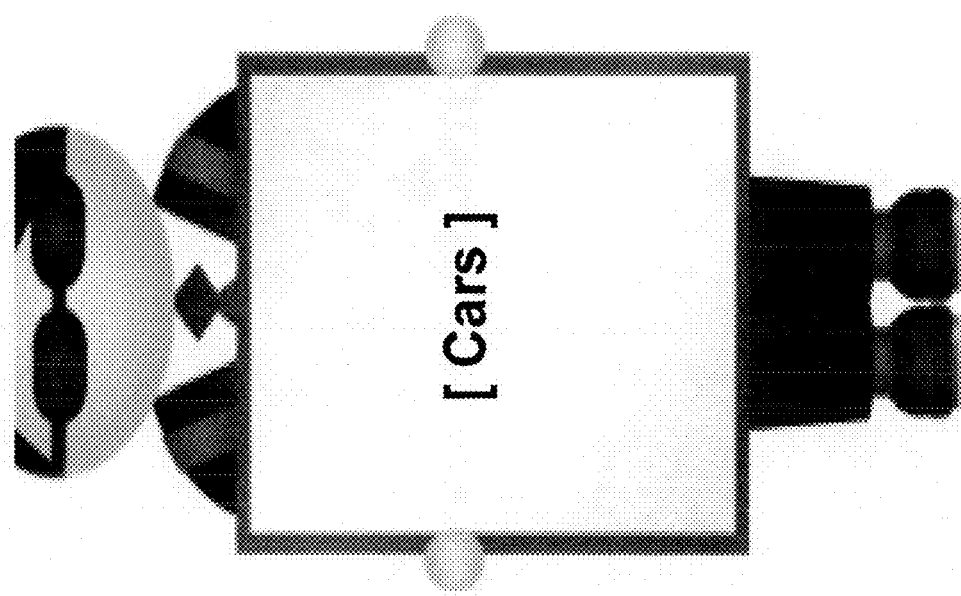
Figure 11  Clickable text

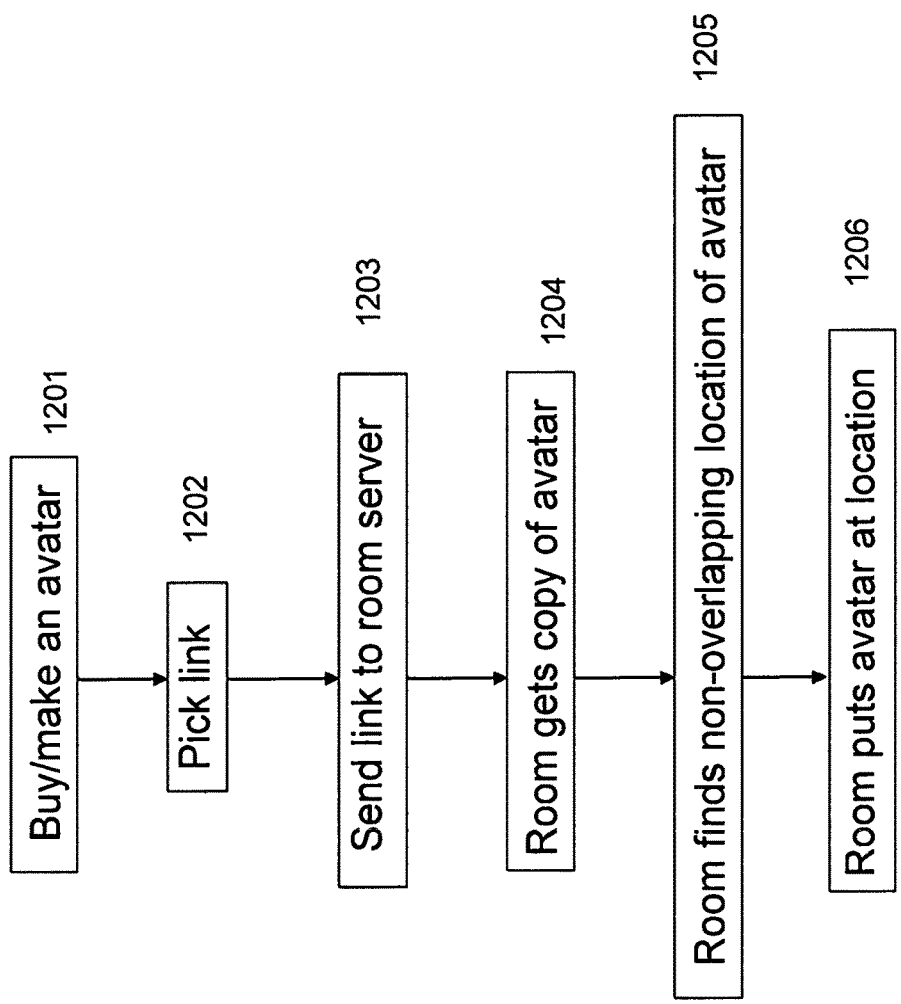
Figure 12 Launching avatar into a room

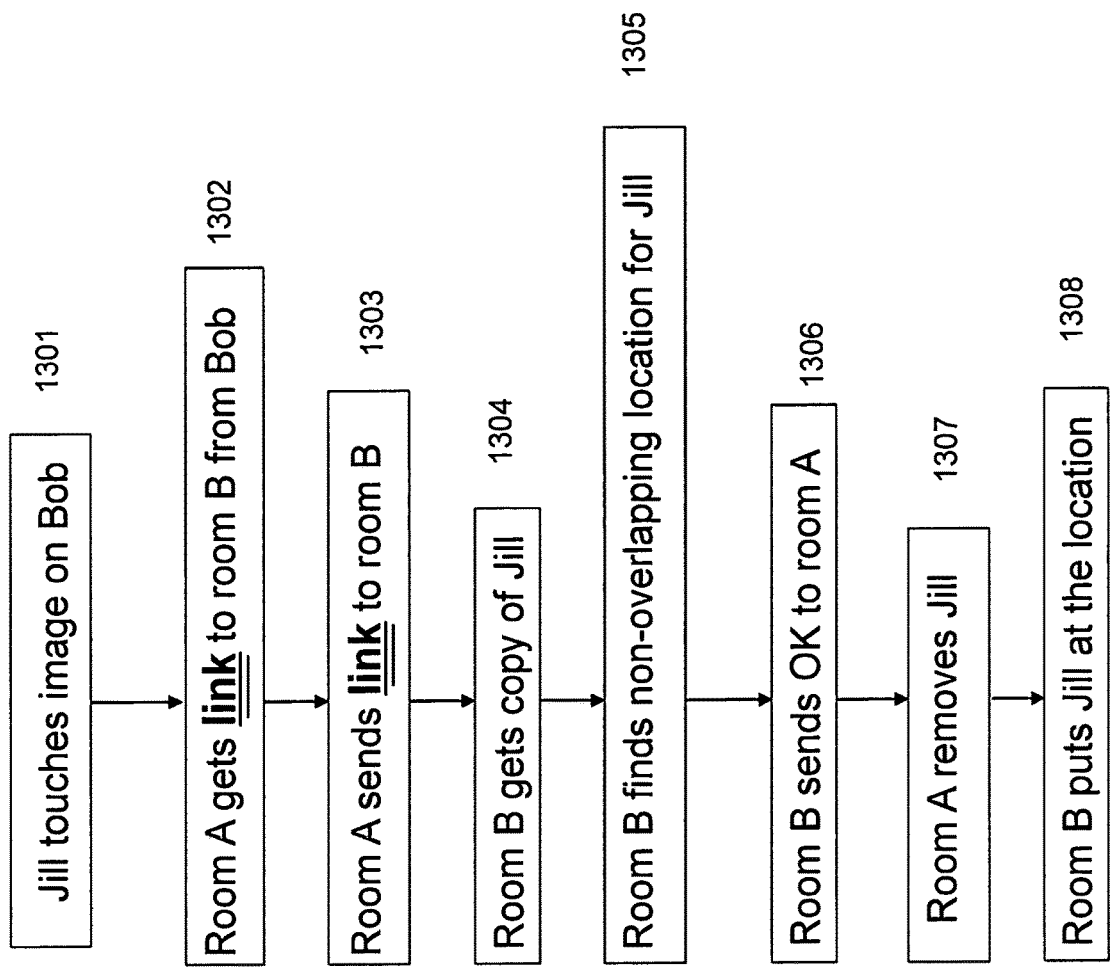
Figure 13 Avatar clicks image on another avatar

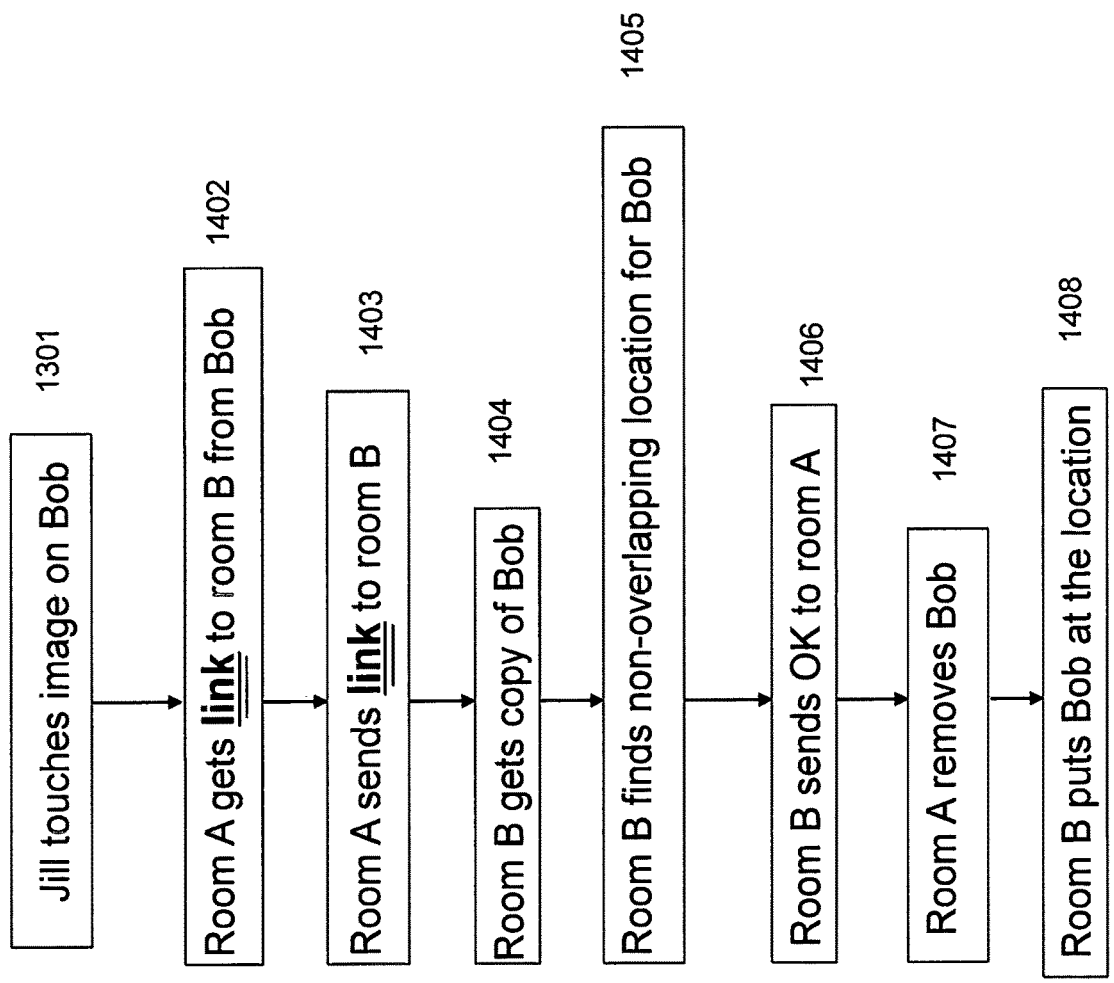
Figure 14 2nd avatar goes to link

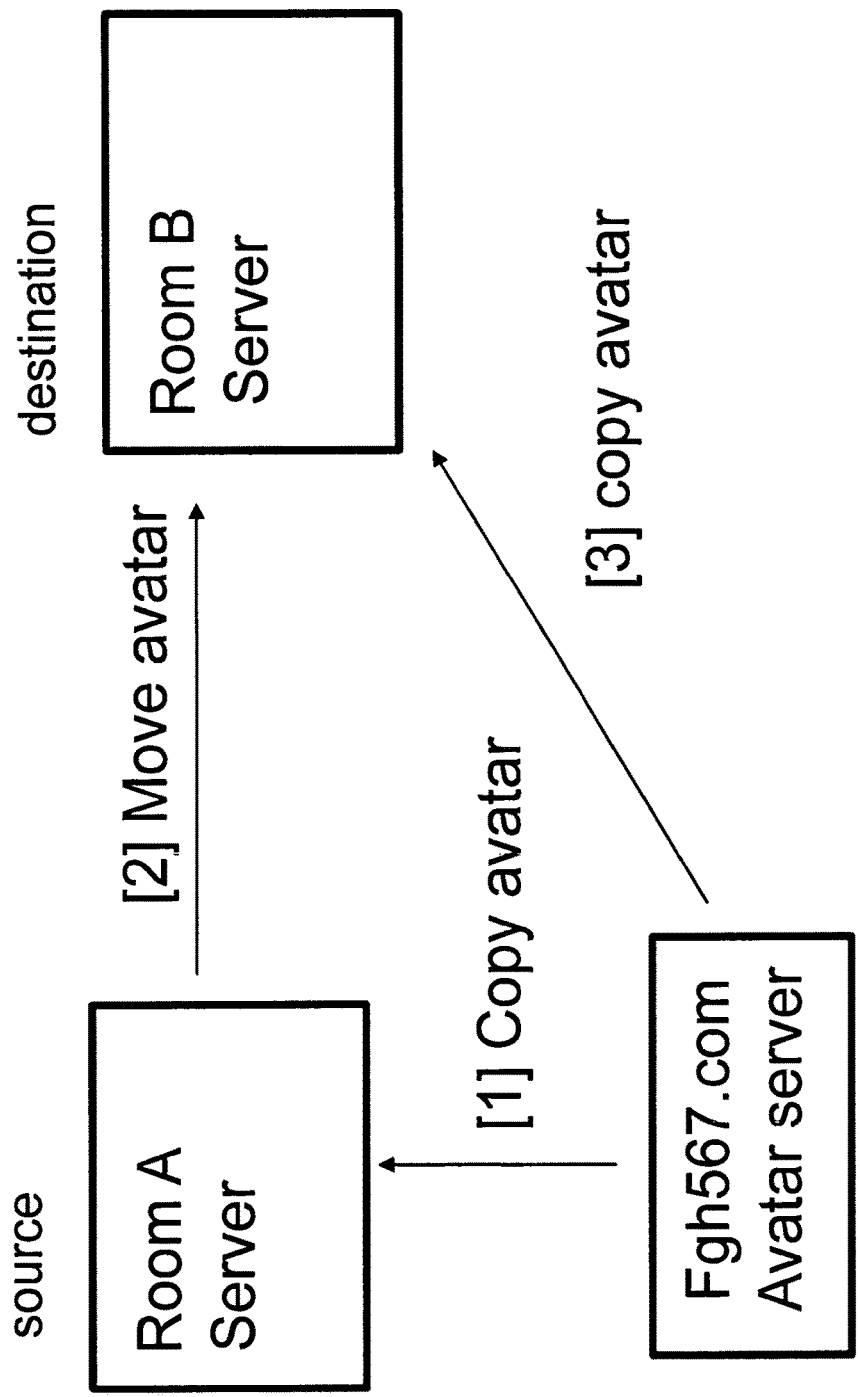
Figure 15 Servers used

METAVERSE AVATAR WEARING A CLICKABLE LINK

TECHNICAL FIELD

Augmented reality, virtual reality and Metaverse

BACKGROUND

Augmented reality (AR) and virtual reality (VR) have grown substantially. This led to predictions of a "Metaverse", notably by FACEBOOK CORP, which has rebranded as "META". The Metaverse is a simulated 3d environment in which a so-called "Web 3.0" might happen.

There is much activity on making new hardware Heads Up Displays (HUDs) in which to view and take part in the Metaverse. For example, FACEBOOK bought Oculus and is making new Oculus HUDs. GOGGLE is emphasising AR HUD development, inspired by the success of Pokemon Go, a game made by NIANTIC. The latter is a joint venture between GOGGLE and NINTENDO.

There is hype about the Metaverse. Topics within this that have been promoted include virtual real estate. One purported reason was that a site might have plots of (virtual) land that are good investments. In part because the owner of a plot could put up signage about NFTs for (eg) images. Either the owner of the plot could sell an NFT directly, or someone else could. In the latter case, if a sale happened, the owner of the plot would be a commission. This would/might increase the value of the plot.

We perceive a fundamental attribute of an avatar that goes into a VR room. The avatar can have a clickable link on its outer surface. We are all aware of how in the Web, the link is the key attribute of its success. Metaverse adherents suggest that the avatar is a key property of the Metaverse. If so, then imbuing the avatar with the ability to display a link, that other avatars can click, is likely to be important.

BRIEF DESCRIPTION OF THE DRAWINGS

FIG. 1 shows 2 users with different criteria to admit a guest to their VR room.

FIG. 2 shows an NFT pointing to an image.

FIG. 3 shows an avatar with a sandwich board showing an NFT image.

FIG. 4 shows an avatar jumper's sleeves, for showing NFT images.

FIG. 5 shows avatar Tim singing to avatar Jill to go to another room.

FIG. 7 shows just a bird avatar singing to avatar Jill.

FIG. 8 shows a control panel for a root user.

FIG. 9 shows expanded sight for an avatar.

FIG. 10 shows expanded hearing for an avatar.

FIG. 11 shows an avatar wearing clickable text on a sandwich board.

FIG. 12 shows an avatar going into a VR room.

FIG. 13 shows an avatar going to another room by touching a second avatar.

FIG. 14 shows the second avatar going to the other room.

FIG. 15 shows an avatar going from 1 room to another.

REFERENCES

Figure 6:
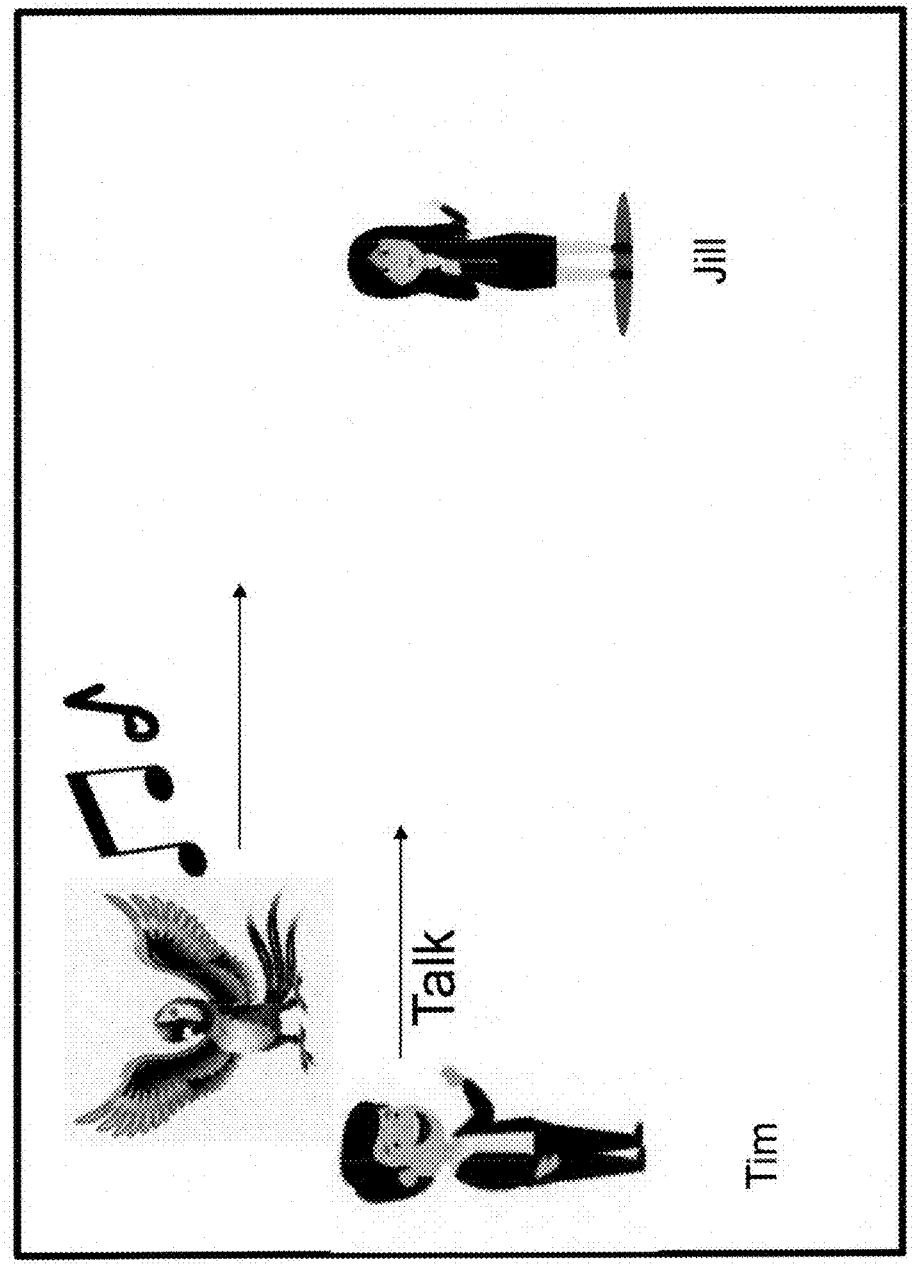
FIG. 6 shows avatar Tim and a bird singing to avatar Jill to go to another room.

"Contextual templates for modifying objects in a virtual universe" by Finn et al. #20100177117, 14 Jan. 2009.

https://9to5mac.com/2022/01/04/report-apples-upcoming-ar-vr-headset-will-feature-innovative-three-display-configuration/

DETAILED DESCRIPTION OF THE PREFERRED EMBODIMENT

What we claim as new is set forth in the following. This application has the following sections:
1] Blocking avatars from visiting your VR room;
2] An avatar showing an NFT image;
3] An avatar showing a clickable image;
4] Singing a link to another VR room;
5] Control panel;
6] Superpowers;
6.1] Sight;
6.2] Hearing;
7] An avatar showing clickable text;
8] Implementing a clickable link on an avatar;
9] 2 Avatars going to a clickable link;

1: Blocking Avatars from Visiting Your VR Room;

Consider a couple, Doris and Bob. See FIG. 1. They want to host a party in a room in the Metaverse. Maybe they already built the room. Some guests they already know as friends, so those are invited. But there could be others that they do not know. They want to run a filter on these and reject those that do not fit their criteria.

Doris is pro (US) Second Amendment. She does not care what the avatars look like, but she wants to filter against the views of the users who run the avatars. She asks the room to search social media for each user. Here she requires that the guests tell the room their real names. She directs the room to search FACEBOOK and LINKEDIN, though she could also ask the room to search other sites. She asks the room to detect gun control users. This can be done by a text search for (eg) "gun control" against a user's name. If the search detects such a user, he is rejected. She understands that the search can be fallible.

Bob is pro life. He does not mind chatting with pro choice users. But he insists that a user's avatar not have any pro choice slogans, like on a t-shirt. Bob has the room run image recognition on the avatars (front and back). If the room finds a pro choice slogan, the user is rejected. Bob is fine with a pro choice user with an avatar wearing a sporting team's jersey or business suit, for example.

FIG. 1 shows the steps done by the Metaverse room. The point is that while this is just an example, the technical steps done by the room are feasible today. The example can be made more elaborate by having (eg) Doris also having criteria on the users' avatars, so that she imposes steps for the room to do to check the avatars. And Bob could have criteria on the occupations of the users, which leads to having steps the room can do against social media.

2: An Avatar Showing an NFT Image;

FIG. 2 shows an NFT (Non Fungible Token) pointing to an image. The latter might be a GIF or JPG or encoded in some other digital format for an image. There is serious doubt about what ownership rights, if any, that an NFT confers on the owner of the NFT.

Leaving this aside, see FIG. 3. It shows an avatar wearing a sandwich board. The board shows the image from FIG. 2. The avatar is advertising an NFT of that image.

Now take the avatar and send it to a VR site that is selling virtual real estate. On a virtual plot, the owner can control what signage and buildings appear on it. Typically, while the owner also can control what avatars appear on her land, in practice this might not be done. She wants avatars (and their users) to visit her land. Maybe to buy some virtual items that she is selling. These items might include NFTs. But user Ann might have the avatar of FIG. 3. She walks her avatar to the VR site selling real estate. She walks thru the site, inviting other avatars to talk to her. She hopes to interest them in buying the NFT she is selling.

The owner of a given plot of land might ask her to leave. But in VR sites that sell land, they often have public areas, like sidewalks or parks, She can walk on these with her billboard. If she sells her NFT to another avatar, she does not pay a commission to the owner of any land on the site.

A variant is where her avatar can put images on its sleeves, as in FIG. 4.

Taking this further, the sandwich board or jacket (including sleeves) that the avatar uses to show images can have those surfaces show images that change over time. So when a first image of (eg) trees is shown on the sandwich board, this appears for (eg) 2 minutes. Then it is replaced by a second image of (eg) tropical fish for the next 2 minutes. This can go on with a cycle of several static images.

This can be extended to a video being shown on the sandwich board or jacket of the avatar. Here the NFT points to the entire video.

A further variant has to do with Ann selling an NFT pointing to an audio file on the Internet. She walks thru the site. Her avatar opens its mouth and plays the song. The audio can also include a statement that there is an associated NFT for sale. Or perhaps her avatar can be wearing a shirt that says this in writing. Nearby avatars can hear the song. Or when the avatar is playing the song, the image on her surface includes text that is the name of the song and the NFT's price.

A user who is interested in buying an NFT advertised by her can ask her in virtual reality, avatar to avatar. She can reply with her real world electronic addresses or website. Thru these, she can sell the NFT as an arbitrary digital item. She and a potential buyer transition to the real world to perform the transaction. They bypass the plot advertising another NFT for sale.

Operationally, a simple way of effecting a sale is for the image on the avatar's signage to be clickable, like a standard URL. When the other avatar clicks, she is taken to Ann's site, where she can see the price of the NFT for that image. The site can also show other NFTs and images. At Ann's site, there could be at the simplest level, the equivalent of a website, to sell NFTs. More elaborately, there might be a bot program, likely in the form of an avatar. The bot would be programmed to answer many typical questions from the visiting avatar's user, about what is for sale on the site. Finally, there might be a real person, presented as a person answering questions from visitors to the website. Or powering an avatar on the site. Specifically, the person might be Ann herself.

Can the original site with the various plots of land bar her? This is unclear. If the site is a major site for virtual real estate, this could run into antitrust issues. The site may be engaging in unlawful restraint of trade.

The end result is that actual Metaverse sites like Super World promote their site as a place to buy virtual real estate. An owner of such a plot is touted as being able to use it to (eg) sell NFTs, where the transactions go thru the plot and its owner. But our method here is a way to side step buying an NFT thru a plot of land upon which to conduct sales. One merit is that in a time of intense hype about NFTs, and how these are promoted to, in turn, inflate the prices of virtual real estate, our method helps deflate some of those prices.

3: An Avatar Showing a Clickable Image;

This extends the previous section. Here, suppose there is an avatar in a first VR site/room. It shows an image (or text) on its surface. The image can be clicked by a second avatar nearby. This takes the second avatar to a destination site.

One special case is where the destination site is the same site that the second avatar is currently in. But the avatar goes to a different location in the site.

In the general case, the destination is a different site. The crucial thing is that when the avatar moves in the first site, this is analogous to the site having an URL that is not put there by the site, but by an arbitrary visitor. There is no apparent counterpart to this in a standard website. In the context of websites, it is analogous to a website having a visitor who can write transient clickable links onto the HTML of the site.

The avatar tries to funnel other avatars to the destination site.

The avatar can be directly controlled by a human user, or the avatar could be a bot.

The clickable image (or text) on its surface can be changed to a different image, that points to a different destination than above. Though given how an avatar might be made, this property could depend on the room rescanning all the code that defines the avatar. Some VR rooms might let the avatar's owner change an image on its surface, and the destination that it points to. Other VR rooms might not enable such attributes.

Many filters or steps can be added.

A] The avatar with the link might or might not pick avatars in the first room, to send to the destination. If it picks, it can apply some separate criteria. Eg. Is the second avatar female? If so, then pick it. This emulates real world nightclubs, where women are sometimes favoured as attendees, because they attract male guests.

B] If the avatar does not pick others, then merely by presenting itself to others, it lets them decide whether to pick or not.

C] There might be multiple destinations=multiple sites. If the avatar picks other avatars, then for some of these, it sends to a first destination, for some others, it sends to a second destination, for some others, it sends to a third destination etc. This could be a load balancing measure, where each visiting avatar to a site needs to be supported by avatars (and their users) working for the site.

D] Suppose the avatar meets a group of avatars in the first room. And the group wants to go as a group to the destination. To perhaps buy whatever the destination is selling. The avatar can let each avatar in the group click a same image, so that the entire group ends up at the same destination.

E] Suppose the events in [d] happen. And after the group is at the destination, in the first room, the avatar meets avatar Jodie. She is also interested in the destination. In some circumstance, the avatar can send Jodie to a separate instance of the destination. This is a unique aspect of VR. In the real world this is not possible. Or the avatar just sends Jodie to the same destination as the group. (Just like the real world.)

The image (or text) shown by the avatar on its outer surface is where the image can be mapped onto the "skin" of the outer surface. This is a well known technique in CGI.

On the skin, the image defines an area such that if a second avatar comes within some minimum distance to the area, and a selection or click is performed by that avatar, it is transported to a destination.

At the destination site, the second avatar might buy or sell something to avatar Tim who is already at the site. Or the second avatar might get or give something to Tim. The item can be either a virtual item or a real item.

This minimum distance might have to contend with a minimum distance around each avatar suggested by Meta (Facebook) to prevent sexual harassment. The avatar's user might seek an exemption, if this is possible, to let other avatars get closer. If not, imagine the avatar having a cylinder around it, at the anti-harassment distance. Then take the image on the avatar's outer surface, and project it onto the cylinder. This will (hopefully) tell the second avatar where to "press" or touch. It may be that the anti-harassment surface may be more complex than a simple cylinder, to more accurately reflect the avatar's actual surface shape. But we suspect that a pragmatic implementation of anti-harassment will be a cylinder, at least initially.

More generally, the second avatar can move its finger towards the image, until the finger touches an anti-harassment surface around the first avatar. The precise form of this surface can vary with the implementation.

Plus, there can be an optional "click" done by the user of the second avatar. This can be to ensure that the avatar's user does this extra step to positively affirm she wants to pick the image in question, in order to go to the destination.

When the user of an avatar moves the avatar's finger to touch an image on another avatar, an optional feature might be implemented, if the user needs to click the image in order to go to a destination. The destination might first be written on the user's VR rig. In a way analogous to how, on a Web browser, when its user moves her mouse over a link, the URL is shown at the bottom of the browser. In the current case, the showing of the destination lets the user understand where the VR link will take her, before she clicks.

In the spam wars, this showing of the actual URL is a vital protective step against phishing attacks that send a user to a fake website. Likewise, for VR rooms and links, we can expect future forms of fake VR sites. Having this feature of showing the VR destination before actually going there can be vital.

When the first avatar goes around the site and talks or otherwise interacts with the other avatars, to induce them to click the link on the first avatar, the first avatar can offer a discount on something being sold at the destination. Or some type of real or virtual prize or gratuity. The key aspect is that the first avatar is competing with other such avatars and the buildings and plots of land on the site, that might be selling competing products or services.

4] Singing a Link to Another VR Room;

Consider an avatar Tim and an avatar Jill, both in the same VR room. Tim "sings" a music-encoding of a link. The link points another VR room. (Or the link might be a standard URL.) Tim can also say vocals about what the song encodes. And Tim can say what software might be needed by others, to decode the song.

Jill is in earshot of Tim in the room. She hears the song. In her, the now-recorded song is decoded to the link. She (ie the user controlling Jill) can choose to "pick" it. If so, this is analogous to a human user clicking an URL in a webpage. Jill is taken by the picked link to another VR room. (A special case is where the VR room is the first room.) See FIG. 5.

The euphony of the song can be a way for a promoter to market the VR room being pointed to by the song. This differentiates the link from another link perhaps being shown as text on a poster in the room.

A variant is where Tim the avatar carries a bird avatar on his shoulder. The bird sings the song. Tim says what the link is about. His vocals can also say what software might be needed to be installed on Jill by her owner, to decode the bird's song. See FIG. 6. It depicts the bird as flying. Though as a practical matter of minimising computations, it likely could be perched on Tim.

It is mainly a matter of semantics whether to consider the bird as a fully fledged avatar or simply as a bot. And the bird might be "permanently" perched on Tim's shoulder. In this case, the bird might simply be considered as a part of Tim the avatar.

An elaboration is possible. The room might let Tim focus his vocals directly on Jill. This is an example of where a Metaverse/VR room deliberately differs from reality. Likely Tim has to look directly at Jill. He might have to be close enough to her (eg less than 5 m). Then if he "speaks", his vocals can only be received by Jill. At the implementation level, the vocals comes from a software output associated with avatar Tim. The port is only connected to the input port of avatar Jill.

This type of enhanced privacy can also apply to the bird.

Another related variant is where there is no human avatar Tim. There is just a bird avatar singing a bird song encoding a link. The bird might say what the song encodes. Or near the bird can be visuals suspended in the air that say (eg) "the song encodes a link to another room". This use of visuals is another example of the room deliberately offering more than a real room. See FIG. 7. Here, the bird song might be audible to all within a certain distance (earshot). Or the song could be sent only to 1 recipient, or a few recipients.

The question of whether avatar Tim can speak only to 1 avatar Jill and not also to another nearby avatar Lucy is left open to the policies of the room they are in. Each VR room goes to great lengths to emulate reality as closely as it can. So a room with Tim singing to Jill might also make it audible to Lucy. But once a room can do this emulation to its satisfaction, it can explore how to "extend" reality with special effects.

If so, another factor is possible. Suppose Tim speaks only to nearby Jill, but Lucy is also nearby. If Tim is animated such that his mouth and lips move in an accurate rendition of what he says, then Lucy can run lip reading software to try to deduce what he is saying. But VR offers a solution. What Jill sees in Tim corresponds to what he is saying. But the visuals of Tim seen by Lucy might just have (eg) Tim's mouth moving up and down, in a zeroth order emulation of him speaking. The room can advertise this as a privacy enhancing measure.

This can be extended. The latter animation can be as though Tim were saying "Let's try to play another song". This acts as an innocent and still meaningful to the bulk of the avatars around Tim.

5] Control Panel;

The methods of the previous section can be generalised. See FIG. 8. It is an example of a control panel for a root user who supervises the VR room. The Avatar column refers to an avatar who is sending a message. The Targets column are the avatars the message is for. The Message column is the decoded message. The type column refers to whether the message is sent as audio or text or some other alternative.

It is implied that instead of an avatar, the column could have an id of the user controlling the avatar.

For the example of avatar Tim, the audio type means that his message is sent as audio, only to avatar Jill. It can be imagined that the Message column could have the "other" message sent to other avatars. In this case, the Targets column might be shown in a different way, to indicate that the "other" message was not for the targets.

For the example of avatar Dinesh, the type column value of text means that (eg) Dinesh was near an AR board on which he actually wrote "see my playlist", and this was visible to avatars Mark and Laura. Whereas other avatars would see different text on the board.

For the example of avatar Grace, the message type is text. But here the text is on her jacket. She writes 2 examples of text. One is only seen by Rahul. The other example is only seen by Chee. Others would get different text on the jacket.

The root user might also be root for other VR rooms. We can imagine an extra column in FIG. 8, showing the room name for such a user.

The above only shows some types of misdirection possible when users are in virtual reality. But it gives an indication of what is possible. The panel lets root check that users doing such misdirections are (hopefully) benign.

The control panel also lets root control various aspects. For the audio interaction, root can turn it off just for avatar Tim. This prevents Tim from sending a specific audio message to Jill.

For Dinesh, root can prevent him from making some messages on a board be just for certain avatars. So what he writes on the board must be visible to all avatars.

For Grace, root can prevent her from making messages on her outer jacket be just for some avatars.

FIG. 8 also shows avatars that have links to other rooms written on their outer surfaces. Avatar Jeff has an image that can send another avatar to room Moonbase. While avatar Ramon has an image that sends avatars to room Drum & Bass. The example in FIG. 8 assumes that the root user has the ability to change the destination, which might not be true for some rooms.

More generally, a "generic" avatar user might be able to set a destination of an image on her avatar, subject to this being in a list of approved destinations. And perhaps also subject to a second check against a list of forbidden rooms.

Also. The ability of user Ralph to write a text on a virtual surface and specify that it can only be seen by another user Sue, while also writing a second text on the same surface, and say that it can be seen by all others can be regulated by root. The room can charge a fee to Ralph. The room might also charge Sue a fee, to be able to read such messages.

6] Superpowers;

The implementation of Metaverse/VR rooms also allows deployment of comic book-type superpowers. Specifically, extended hearing and sight.

6.1] Sight;

A room can offer a user the equivalent of binoculars or single eye telescope. But without the need to carry and use these as in real life. Let Jill be an avatar in a room. Bob is an avatar some 200 m away. (It's a big room.) She wants to look more closely at him, without approaching. Assume she has a line of sight on him. The room might let her "zoom" in, perhaps if she pays a fee.

The zoom emulates her using a telescope. In her VR/AR rig, it lets her bring up an enhanced vision screen. See FIG. 9. But while this shows what she might see via her rig, in the VR room she just appears to be looking in his general direction. If he is near others, a casual observer cannot tell that she is focusing on him. FIG. 9 also shows a currency symbol (here a dollar). This might be done if the room is charging her for this service. The room maintains a default level of functionality, to show avatars. But for an expanded service like this, it might opt to charge, because it requires extra computational cost by the room.

FIG. 9 also shows the results of running lip reading software by the room on Bob. This also could incur a fee. The " . . . " in the text indicates where the lip reading could not discern what he said.

An objection could be raised. That spoken question by Bob is in VR. It is sent directly to those avatars near him. We assume Jill is too far away to overhear. Surely the digitised form of his question could be analyzed instead, and be more accurate, because the room has this and would not be starting from lip reading? Yes. But the room perhaps does not offer this analysis of the direct feeds to each nearby avatar's inputs. This might be deliberate. To maintain the illusion of reality. In keeping with this, lip reading helps. And so does the "telescope" and the line of sight restriction. Even though the latter is not an absolute constraint.

But the room, or another room, might enable a non-line-of-sight ability. And perhaps charge more. The controls made available to the user get slightly more intricate. For lip reading, the room can itself zoom in on any avatar easily.

6.2] Hearing;

An expanded hearing ability can be implemented several ways. We describe one of them here. A room can let the user move a virtual ear to some location, and then get the audio output from users within a certain distance (eg 10 m).

A nuance is where the room lets the eavesdropper get each voice as a separate input. See FIG. 10. The room has a map. The 'x' is the eavesdropper's location. The '+' is the location where she wants to overhear users. The map shows 'a', 'b' and 'c' as the locations of 3 avatars. Under the map are images of each avatar. The filled triangle by each is a play button. The user presses this to hear each avatar's vocals. The boxes by each triangle are found by Automatic Speech Recognition.

This example assumes no lip reading. The separation of each avatar's voice into separate audio tracks is enabled by the VR aspect of the room. In real life, if the vocals all are recorded at the '+' location, the listener would have to try to discern what each person said.

Variants of the above are possible.

First. At the point '+' where the "microphone" is located, perhaps the soundtracks of each speaker should be combined into 1 track.

Second. Does the track from each user at '+' take into account the orientation of the user?

Third. Does the actual volume of a soundtrack at '+', take into account a natural fall off in volume due to distance?

7] an Avatar Showing Clickable Text;

Instead of an avatar showing a clickable image, suppose it shows clickable text. FIG. 11 shows an example. The avatar's sandwich board says "Healthcare" in Chinese. The opening and closing square brackets are used as delimiters, to make what we call a "linket". It is analogous to a domain name, but does not have (eg) a .com or .com.cn suffix. The brackets serve as the delimiter.

Linkets are not strictly necessary. The clickable text might just say "Healthcare" in Chinese. But if they are used, it creates a business opportunity. If we use an existing domain name, like health.com.au, this is likely already owned by a firm. And the domain registrars act as gatekeepers over the Top Level Domains. So a firm wanting (eg) cars.com will find that it is already owned, and could cost millions to get.

An owner of a linket can likely get a linket formed from a common word in English or any other language. When a linket is clicked, the owner of it can point it at an arbitrary URL as the destination.

8] Implementing a Clickable Link on an Avatar;

We now describe in more detail how an avatar clicks a link on another avatar. Start with FIG. 12. These are the steps to go from an avatar owned by a user, to putting the avatar in a VR room. Step 1201 means the user buys or makes an avatar. The avatar is mostly just a skin of polygons. This step can be very intricate if the user has to do this. The user has the avatar in some coordinate space, by itself. The user likely can manipulate the avatar's limbs to move them. She might be wearing a VR rig and is seeing a first person or third person view of the avatar. Her rig might be connected to a nearby computer of hers, either by wire (tethered) or wirelessly. Or she might use the latter machine to make or modify the avatar.

The data of the avatar might reside in storage on the rig. This could be an optimum choice for performance. Or the avatar data might be on the nearby computer. Or stored in a server in the cloud.

Step 1202 is where she gets a link from some external source, like the Internet. The link is the address of a VR room. The link is probably just text. (It could be in the format of an URL.) The lowest level approach is where she has to type in the link on her computer or rig. More likely, she can click a link that she has gotten from elsewhere. The link goes to a server for the VR room in step 1203. In general, this room server will not be the same as the server holding the avatar. We expect that different rooms will have different servers.

An example of what the link might be:
Room3.com/ayserver=fgh567.com

Here room3.com is the destination VR room. The ayserver is the label of the avatar server. And fgh567.com is the avatar server. When the link is originally clicked, it is just room3.com. The avatar that clicks it appends "/ayserver=fgh567.com" to the link. The avatar knows the address of its avatar server.

The room gets the link. It interacts with the avatar server to get a copy of the avatar in step 1204. The above assumes that the avatar server exposes an Application Programming Interface (API) that the room knows. The room interrogates the avatar server via the API to get a copy of the avatar.

For performance reasons, the room needs the copy because of the VR operations it has to do on and with the avatar. To first approximation, when an avatar is defined at an avatar server, and it is then copied to various VR rooms, there will be no changes made to the avatar while it is in those rooms. So there is no problem with versioning of the avatar. If this becomes a problem, more intricate methods can be done to handle changes made to the avatar during its use in the rooms.

The room finds a location (x,y,z) to put the avatar in the room in step 1205. It does this and starts the avatar, which can now see thru its eyes at the room in step 1206. The user can now articulate her avatar and move around. If there are already avatars in the room, the room has to put the new avatar in a place that does not overlap the avatars. This can include dealing with an anti-harassment field around most/ all of the avatars.

The above has been done by several firms. Some details vary, but the above is the likely commonality of steps.

FIG. 13 shows how an avatar in a room goes to another room by touching a clickable link on a second avatar. Let the first avatar be Jill and the second avatar be Bob. Both are in VR room A. Bob wears an image that has a link to VR room B.

Step 1301 shows Jill touching the image on Bob. If there is an anti-harassment shield, the touching is on a projection of the image onto the surrounding shield. The image is implemented on the skin of Bob by having an associated text string that is the link to room B. When Jill touches the image on Bob, this causes room A to get the string from the data defining avatar Bob. See step 1302. The image is a subset of Bob's skin. That, by itself, is just a geometric statement. But functionally, this image subset is associated with a destination that is the associated text string. The address in the link points to room B.

Room A sends the link to room B in step 1303.

Room B gets the data defining Jill in step 1304. This is essentially the same as step 1204. Just as room A had to find the geometric data defining avatar Jill.

Room B finds a non-overlapping location for Jill in step 1305. This is essentially the same as step 1205. Room B sends an ok to room A in step 1306.

Room A now removes its copy of Jill in step 1307. If room B cannot find a non-overlapping location, then Jill stays in room A.

Room B puts Jill at that location in step 1308.

For simplicity in FIGS. 12 and 13, when an avatar appears in a room, filters have been omitted that test the avatar and its user against various criteria imposed by the room. These include the steps in Section 1 of this application.

Also, FIG. 13 omits a key point at the end. When Jill now appears in room B, then somewhere on a machine that is not B's or A's server, where Jill's location is definitively stored, her location is updated to room B. As an example, that machine could be the rig used by Jill's user, or an associated computer physically close to her.

Looking at FIG. 13 suggests a possibility. Room B could have a link pointing to a room C. When Jill presses a link to room B, she can end up at room C. But a nuance might be important under some circumstances. There might be no need to do step 1304, where room B gets a copy of Jill. This step is not needed if Jill never takes up a location in room B in step 1308. So testing by room B can be omitted. And testing by room C to find a location in that room is faster when the copy of Jill in room C can just be directly copied from room A.

Note that the order of the steps in FIG. 13 can be varied.

9] 2 Avatars Going to a Clickable Link;

Consider FIG. 13, where avatar Jill touches a clickable link worn by avatar Bob. They are in VR room A. The link can implement an effect where Jill and Bob go to the same destination—the link pointed to by the image on Bob. FIG. 14 shows the steps done in order to move Bob to room B.

The steps in FIG. 14 that apply to Bob are similar to the steps done to Jill in FIG. 13. When Bob's link is written into his skin, it has a flag that lists Bob's avatar server and tells the room that the link is to move 2 avatars to a common destination.

Note in FIG. 14 that it has 1 common step with FIG. 13. The first step, where Jill touches the image on Bob. If we imagine that the steps in FIG. 13 are done first to Jill, then she appears first in room B. Now in step 1405, for Bob, the non-overlapping location for him takes into account the presence of Jill at her location in room B.

But what if due to Jill being in room B, it cannot fit Bob? This is unlikely. He just has to be near Jill, where "near" can be left to the room to define. But if still he can't be fitted into room B, then Jill can be moved to a different location, and the room retries to fit Bob.

Bob can be placed in line of sight of Jill in room B.

Note from the example given above of what the link might look like, that example was for sending Jill. Now for sending Bob, the principle is the same. The link has the address of Bob's avatar server. It can take an extra flag, to indicate that this link now will move both Bob and an avatar that clicks it.

If this double moving of avatars is implemented for Bob's link, then Bob can tell other avatars near him about it, when they approach. Or it might be written as part of his image on his outer surface. Or it can appear as visible text as a floating sign accompanying Bob as he moves around room A. Or Bob might have (eg) a bird near him, or on him, that says or sings this in ways described earlier.

Why would Bob have such a link? One reason might be if Bob wants to give avatars like Jill a private tour of room B. Bob might work for site room B, which wants him to find avatars like Jill on other sites, and take them to room B.

Another reason is dating. Avatar Bob and avatar Jill can go on a date in room B.

This effect of an avatar clicking an image on avatar Bob and then both going to the same destination can be retained even if Bob jumps to another site.

Now consider Bob going near avatar Jay. And Jay is wearing a clickable link that will send an avatar to site Phi. If Bob clicks Jay's image, Bob goes to Phi. Bob's 2 person clickable link goes with him, and can still be active.

FIG. 15 shows the various servers involved. The steps [1], [2] and [3] occur temporally in that order. Step [1] is when the avatar is first copied into room A from the avatar server fgh567.com. At this point, the avatar has not yet clicked on a link on another avatar in room A. Step [2] is when the avatar finds an avatar in room A wearing a clickable link, and the avatar clicks it. The "[2] move avatar" describes the entire process of moving the avatar from room A to room B. The most important of those steps is [3], where the avatar is copied from its server to room B.

I claim:

1. A system of a first avatar and a second avatar in a first Virtual Reality (VR) room;
the first avatar shows an image on an exterior surface of the first avatar;
the second avatar picks the image;
the second avatar is transported to a second VR room;
one of these happens:
[a] the second avatar buys an item from the second VR room,
[b] the second avatar sells an item to the second VR room,
[c] the second avatar gets an item from the second VR room,
[d] the second avatar gives an item to the second VR room;
the item can be virtual or real.

2. The system of claim 1, where:
the first avatar shows an image on a sleeve of a jacket worn by the first avatar.

3. The system of claim 1, where:
the first avatar wears a sandwich board;
the sandwich board shows one or more images that can be picked by the second avatar.

4. The system of claim 1, where:
the avatar carries a flat object;
the object shows one or more images that can be picked by the second avatar.

5. The system of claim 1, where
the second VR room is the same as the first VR room;
the second avatar is sent to a different location in the first VR room.

6. The system of claim 1, where:
the second avatar is part of a group of avatars;
each member of the group clicks the image;
each member goes to the second VR room;
the first avatar meets a third avatar in the first VR room;
the first avatar changes a destination of the image to a different instance of the second VR room;
the third avatar picks the image;
the third avatar goes to the different instance.

7. The system of claim 1, where:
the second avatar buys a Non-Fungible Token in the second VR room;
the second VR room being different from the first VR room.

8. The system of claim 1, where:
a song is played through the mouth of the first avatar;
the image on the first avatar includes text of a name of the song.

9. The system of claim 1, where
the picking of the image by the second avatar involves:
the second avatar pointing with a finger at the image,
one of:
[a] the finger touching the image,
[b] the finger touching a projection of the image onto an anti-harassment surface around the first avatar.

10. The system of claim 1, where
the picking of the image by the second avatar involves:
the second avatar pointing with a finger at the image,
one of:
[a] the finger touching the image,
[b] the finger touching a projection of the image onto an anti-harassment surface around the first avatar;
a click or selection being done by a user controlling the first avatar.

11. The system of claim 1, where:
the first avatar is transported to the second VR room.

12. The system of claim 11, where:
the first avatar in the second VR room is in line of sight with the second avatar in the second VR room.

13. The system of claim 11, where in the first VR room:
the image on the first avatar has text explaining that the second avatar will go to the same destination as the first avatar, if the image is picked.

14. The system of claim 11, where:
the first avatar gives a tour of the second VR room to the second avatar.

15. The system of claim 11, where:
the first avatar goes on a date with the second avatar in the second VR room.

* * * * *